United States Patent [19]
Clare

[11] Patent Number: 5,518,019
[45] Date of Patent: May 21, 1996

[54] DIVERTER AND VOLUME CONTROL VALVE

[75] Inventor: Manamohan Clare, Mississauga, Canada

[73] Assignee: Friedrich Grohe Aktiengesellschaft, Hemer, Germany

[21] Appl. No.: 381,721

[22] Filed: Feb. 1, 1995

[30] Foreign Application Priority Data

Feb. 3, 1994 [CA] Canada .................................. 2114855

[51] Int. Cl.⁶ .................................. F16K 17/168
[52] U.S. Cl. .................. 137/119; 137/467; 137/597
[58] Field of Search .................. 137/119, 597, 137/467

[56] References Cited

U.S. PATENT DOCUMENTS

| | | | |
|---|---|---|---|
| 1,924,771 | 8/1933 | Brown et al. | 137/467 X |
| 2,115,628 | 4/1938 | Fredericks | 137/467 |
| 3,972,344 | 8/1976 | Chauvigné | 137/119 |
| 4,095,610 | 6/1978 | Priesmeyer | 137/119 X |

FOREIGN PATENT DOCUMENTS 1129119  9/1960  Germany .................................. 137/119

Primary Examiner—Stephen M. Hepperle
Attorney, Agent, or Firm—Herbert Dubno

[57] ABSTRACT

The invention relates to a shower control valve assembly which includes a casing mountable in a wall with inlets for hot and cold water. A cartridge is insertable into the casing in one of two orientations so that the hot water inlet of the cartridge can be aligned with either one of the casing inlets, depending on which one is the hot water inlet. The casing has at least one outlet for transporting mixed water to the tub and a diverter passage is connected to the outlet for transporting mixed water to the shower. An insert is positioned in the outlet and has a counterweighted butterfly valve member therein, the valve member being normally in an open position allowing water to flow to the tub. A rod member extends laterally of the insert and is reciprocable so as to contact the upstream wing of the valve member and force it into the stream of water flowing to the tub. The stream forces the valve member to a closed position and then the flowing water is forced to follow the diverter passage to the shower. When the water is turned off, the counterweight forces the valve member to resume its open condition. The rod member is rotatable and cooperates with appropriate means in the insert to effectively throttle water flowing to the shower to act as a volume control therefor.

10 Claims, 6 Drawing Sheets

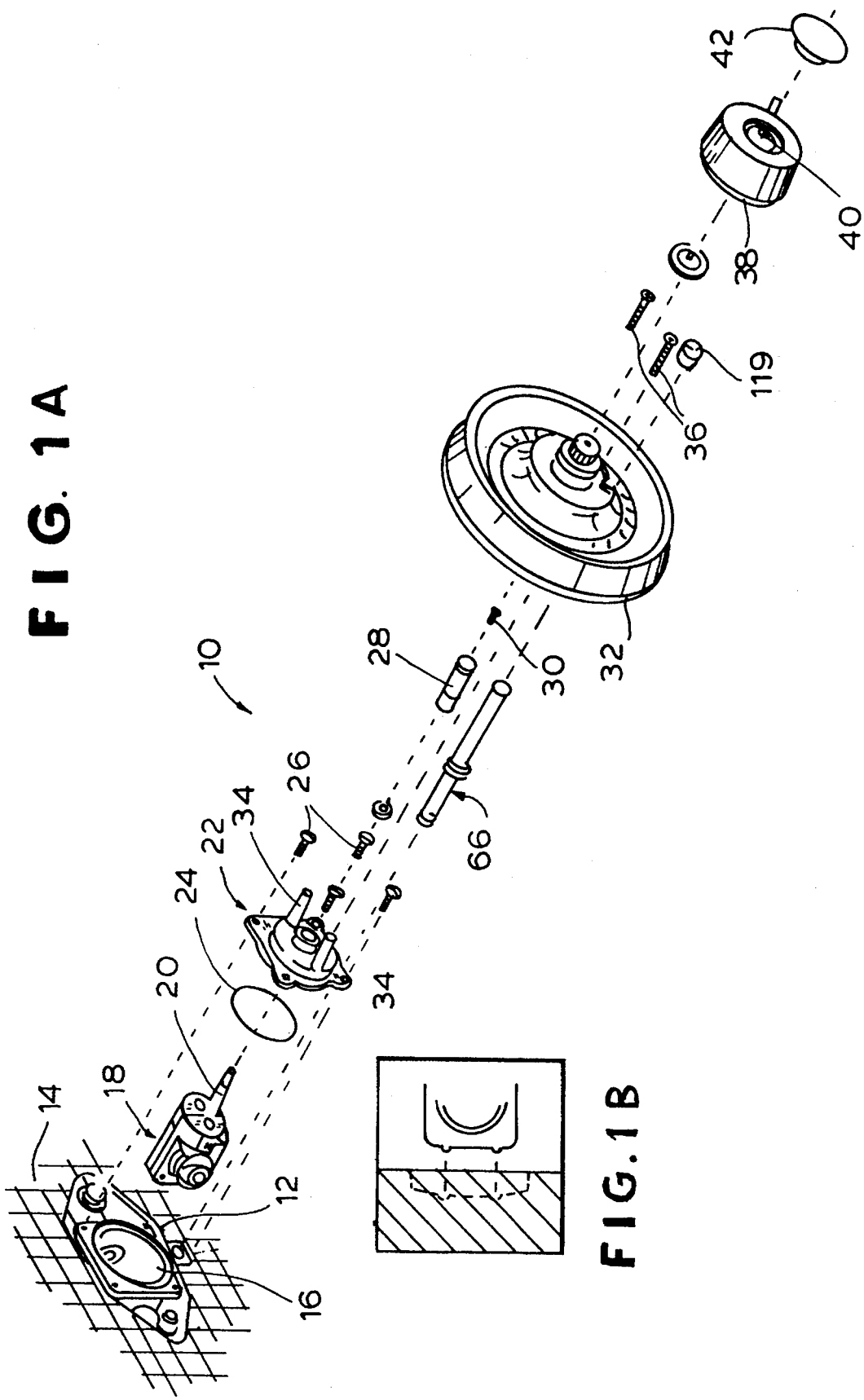

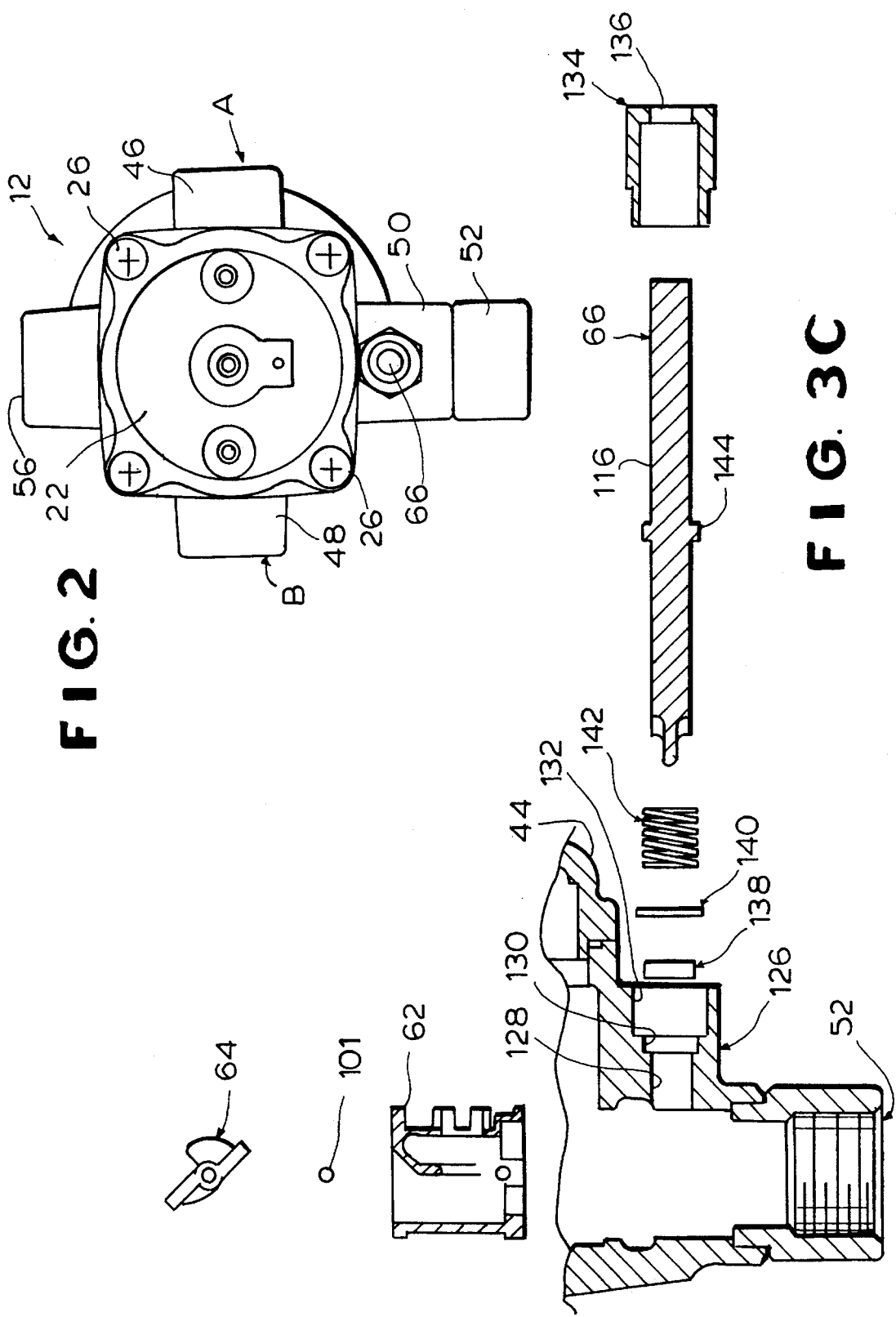

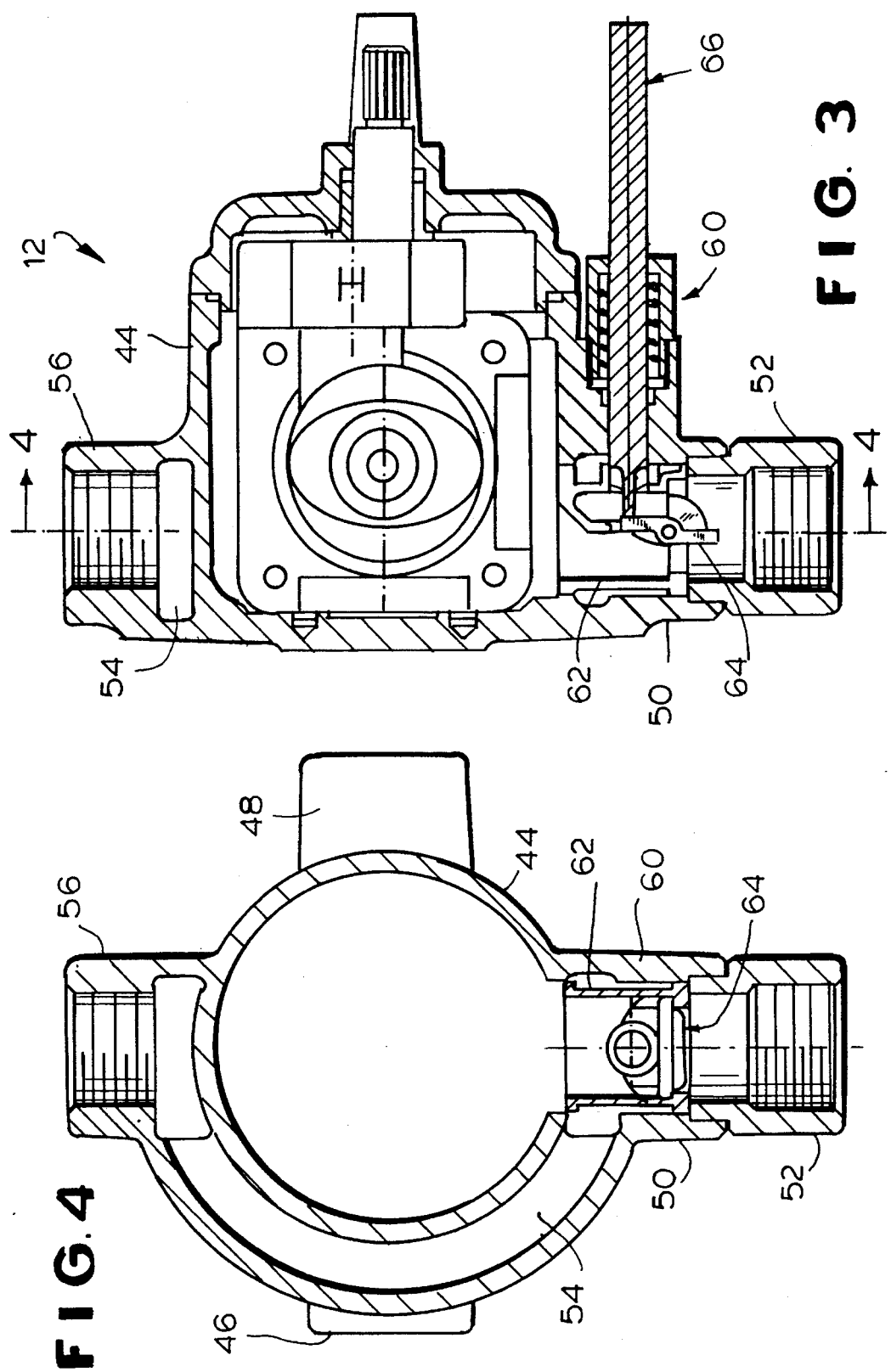

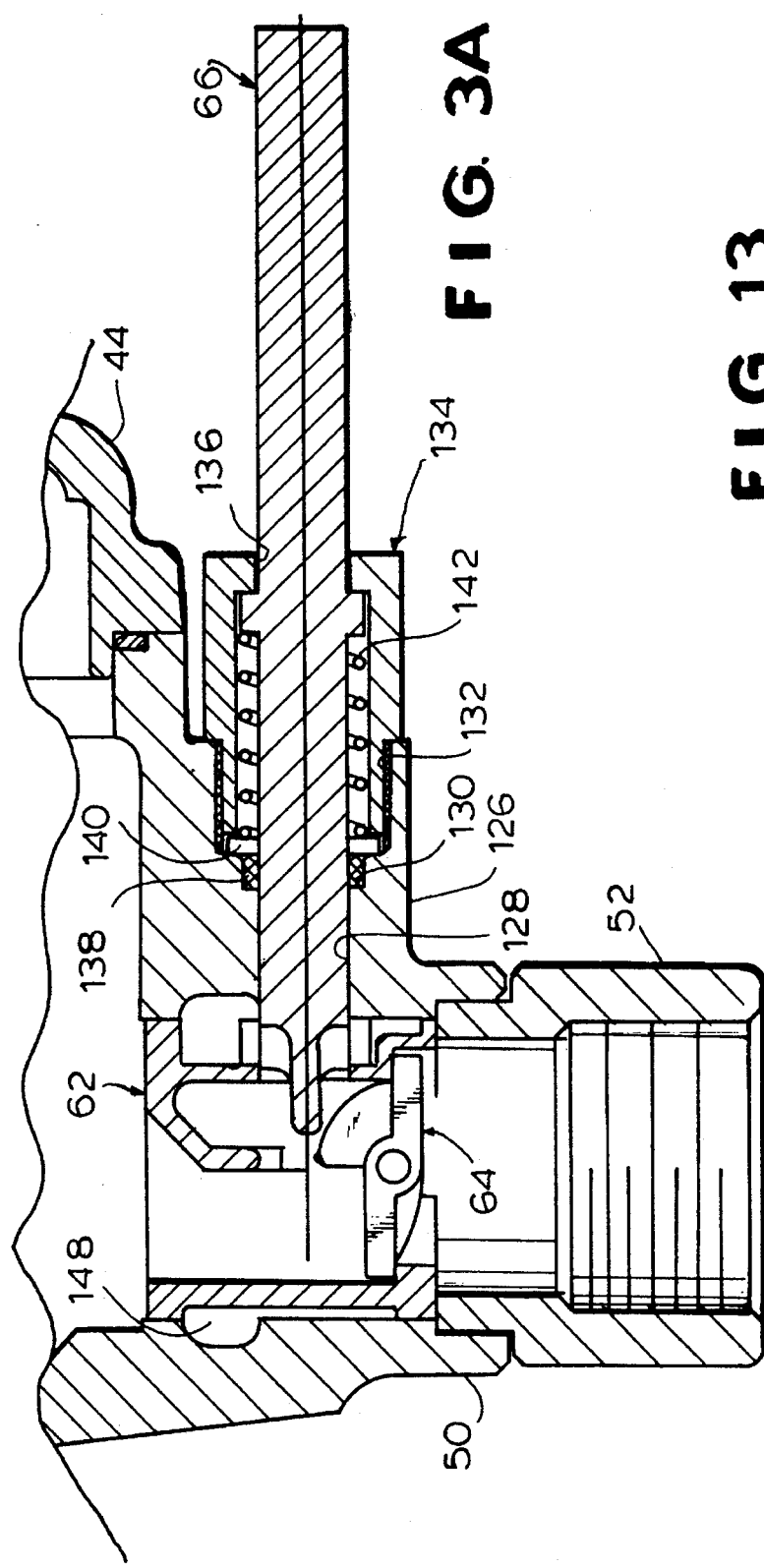
FIG. 3A
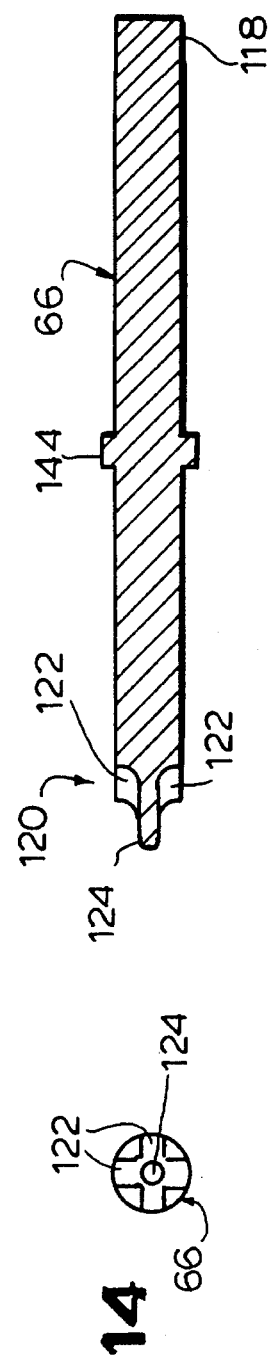
FIG. 13
FIG. 14

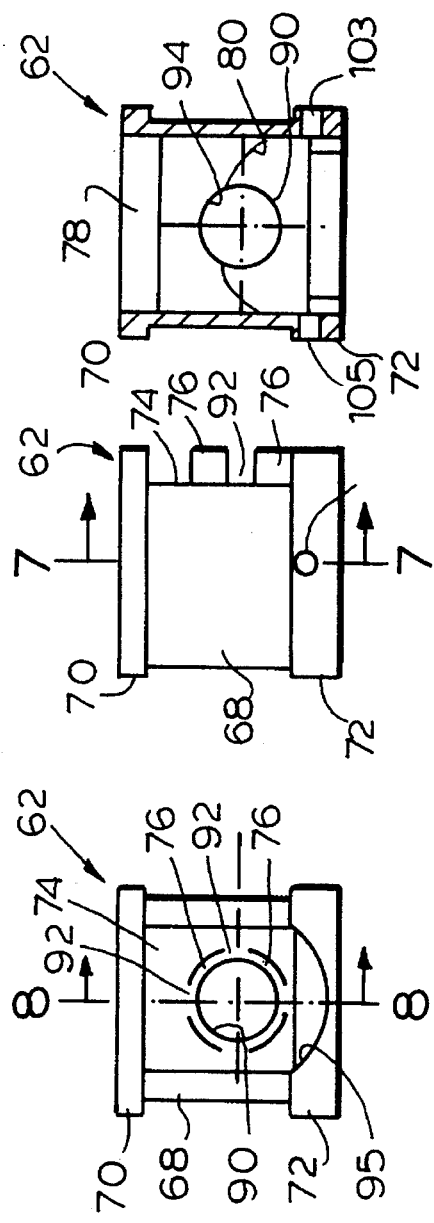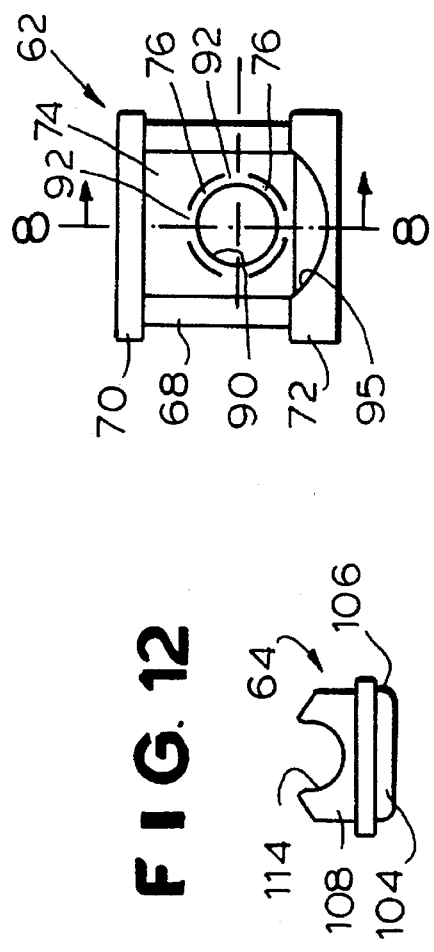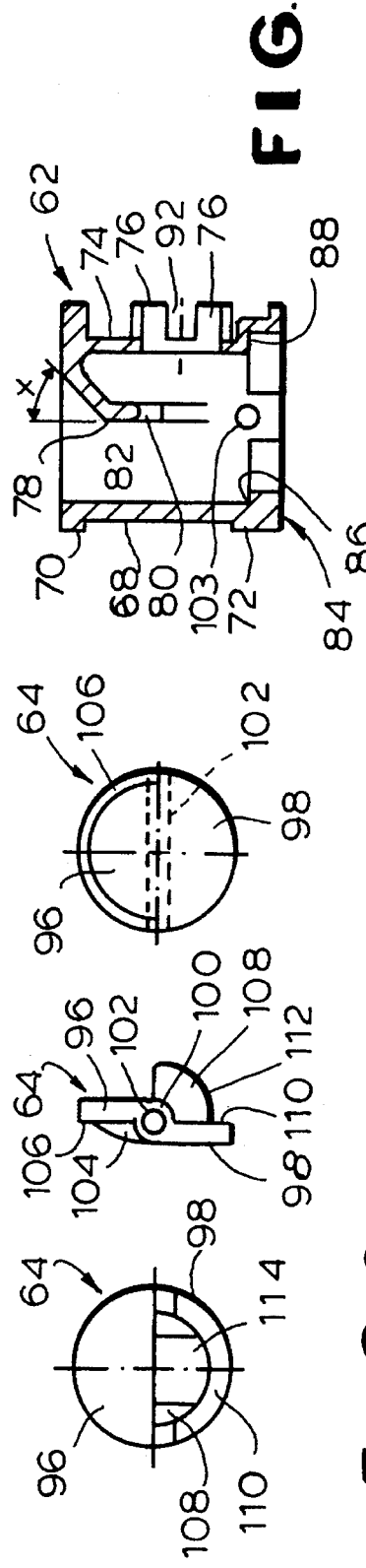

DIVERTER AND VOLUME CONTROL VALVE

This invention relates to a new and improved shower control valve assembly.

BACKGROUND OF THE INVENTION

In the construction of residential and commercial buildings it is common to have back-to-back bathrooms wherein the hot and cold water supply pipes service shower and tub units on opposite sides of the wall. Prior art shower control valves often have the cold water inlet on one side and the hot water inlet on the other side. As the two supply pipes in the wall are normally side-by-side, it is necessary to provide an awkward cross-over arrangement for one of the shower units. Later inventions provided shower control valve assemblies that utilise a casing having two inlets and a replaceable cartridge unit which can be adjusted in a relatively simple manner at the time of installation so that it is entirely optional as to which of the inlets is connected to the hot water supply pipe and which is connected to the cold water pipe. Commonly assigned Canadian Patent No. 1,050,853 of Mar. 20, 1979 discloses just such an arrangement. The valve assembly of that patent is pressure balanced, with a single handle to control the temperature and the pressure of the water issuing from the shower. The casing of the patented valve assembly included a single outlet leading to the shower, water for the tub flowing through a separate spout having a diverter valve associated therewith.

The trend in pressure balanced valve assemblies has been towards single handle control valves which are also adapted to control the flow of water to a tub as well as to a shower. U.S. Pat. Nos. 4,681,140; 4,901,750; and 4,905,732 all teach single handle pressure, temperature and/or volume balanced mixing valves.

One of the problems associated with any water flow arrangement is that of water hammer, generated noise which is frequently experienced in pressure sensing mixing valves when they are installed in line with quick closing faucets or diverter valves. Other problems involve cross flow between the hot and cold water supply lines, back flow in either or both of the supply lines, and wear of the rubber seal that contacts the mixing disc of the valve.

Commonly assigned Canadian Patent Application No. 2,076,924 filed Aug. 26, 1992 teaches a single handle pressure and temperature balancing mixing valve assembly that includes, among other features, a check valve at each of the hot and cold water inlets to prevent cross flow between the hot and cold water supply lines, to prevent back flow to either supply line, and to eliminate the effects of water hammer. Additionally, or optionally, the valve casing may include separate outlets for the tub and for the shower, with there being a built-in bypass or diverter channel to divert water from one outlet to the other and the entire valve cartridge may be rotated through 180° to reverse the hot and cold inlets.

Commonly assigned Canadian Patent Application No. 2,109,034 filed Oct. 21, 1993 provides an improvement to the aforementioned application by having the mixing disc in constant contact with a pair of axially movable seat members and by having each seat member contact a fixed O-ring seal in the closed position of the valve disc. The O-ring is free from contact with any of the moving components of the valve per se. Sealing contact of the O-ring is made only at the valve closing position, thus reducing torque and eliminating wear. Each axially movable seat member is made of a plastics material having a low friction property. The seat members are held in contact with the mixing disc by water pressure only. A circular wave spring place under a snap seal that holds the O-ring exerts enough force to seal the water at low supply pressures. The wave spring also takes up any slack due to the natural wear between the axially movable seat member and a cam surface on the mixing disc.

Another area requiring improvement with such pressure balanced valves is the diverter valve that is used to divert water from the tub faucet to the shower nozzle. The most common type of diverter involves a valve actuator positioned in the faucet itself, such that raising the actuator while water is flowing through the faucet will close the diverter valve and cause the water to be forced to the shower nozzle. If the user of the shower is already in the tub enclosure he or she will have to bend over to actuate the diverter, an inconvenience at the least. Also, such diverter valves are strictly of the "on/off" variety; they do not have the capability of any volume, pressure or temperature adjustment. If there is any failure of the diverter valve it is necessary to dismantle the faucet and the attendant valve structure to effect repair, a time consuming and possibly expensive proposition. There is therefore a need for a more-convenient, adjustable, and easily repaired diverter valve structure for pressure balanced valve installations.

SUMMARY OF THE INVENTION

The present invention provides an improved diverter valve structure for combination tub and shower valve installations, the diverter valve structure of the invention being particularly effective with single handle pressure balanced mixing valve installations. In such installations the valve is usually mounted on the wall of the tub/shower enclosure between the shower head and the tub faucet, at a height convenient for most people. The diverter valve of the invention is incorporated into the casing of the mixing valve and includes an actuating rod projecting outwardly from the diverter valve below the mixing valve handle. The rod is reciprocable and operates a counterweighted butterfly valve in the outlet passage of the valve. While water is flowing through the faucet the rod is pushed inwardly to move the butterfly valve into the stream of flowing water so that the force of the water quickly moves the butterfly valve to close the passage to the faucet. Water then is forced to flow through the diverter passage to the shower head. When the shower is turned off the butterfly valve will automatically rotate back to its open position under the influence of the counterweight provided on the downstream wing thereof.

The rod will have an attractive knob at the outer end thereof for ease of manipulation and the rod will also be rotatable such that appropriately contoured mating housing and rod portions at the inner end thereof can throttle the flowing water and thus control the volume of water flowing to the shower head.

The housing or insert for the butterfly valve will be removable through the front of the casing to effect easy replacement in the event of failure for any reason. This replacement feature is particularly effective when the mixing valve is of the replaceable cartridge variety, such as is disclosed in the aforementioned Canadian patent and patent applications.

Generally speaking therefore the present invention may be defined as providing a diverter valve assembly for a shower control valve assembly having a casing with first and second water inlets, water outlet means leading to a tub faucet, and means within the casing for mixing water entering via the inlets and feeding mixed water to the outlet means. The outlet means is connected to a diverter passage that leads to a shower head. The diverter valve assembly includes a valve insert positioned within the outlet means, the insert including a valve seat and a rotatable valve member. A counterweight on one wing of the valve member biases the valve member to a normally open position. A laterally extending reciprocable rod member has an inner end thereof adjacent the other wing of the valve member for contact with the other wing so as to rotate the valve member into the stream of water flowing in the outlet means and thus towards a closing position, the flowing water in the outlet means moving the valve member to its fully closed position. In the closed position water is prevented from flowing through the outlet means to the tub faucet and is forced to flow into the diverter passage towards the shower head. When the water is turned off at the mixing valve the valve member will rotate back to its fully open position under the influence of the counterweight on the one wing.

BRIEF DESCRIPTION OF THE DRAWINGS

FIG. 1 is an exploded view of a shower mixing valve illustrating the main components of the invention.

FIG. 2 is a front end view of a shower mixing valve incorporating the present invention therein.

FIG. 3 is a sectional view on a vertical plane of the casing with a mixing cartridge installed therein.

FIG. 3A is an enlarged partial sectional view of the valve section shown in FIG. 3 with the valve of this invention in the closed position.

FIG. 3C is a somewhat enlarged partial sectional exploded view of the valve section of FIG. 3A.

FIG. 4 is a sectional view of the casing on the line 4—4 of FIG. 3.

FIGS. 5 and 6 are front and side views respectively of the insert.

FIG. 7 is a sectional view of the insert as taken on the line 7—7 of FIG. 6.

FIG. 8 is a sectional view of the insert as taken on the line 8—8 of FIG. 5.

FIGS. 9, 10, 11 and 12 are top, bottom, side and end views respectively of the butterfly valve used in this invention.

FIGS. 13 and 14 are sectional and end views respectively of the actuating rod used in this invention.

DESCRIPTION OF THE PREFERRED EMBODIMENT

Figure 3B:
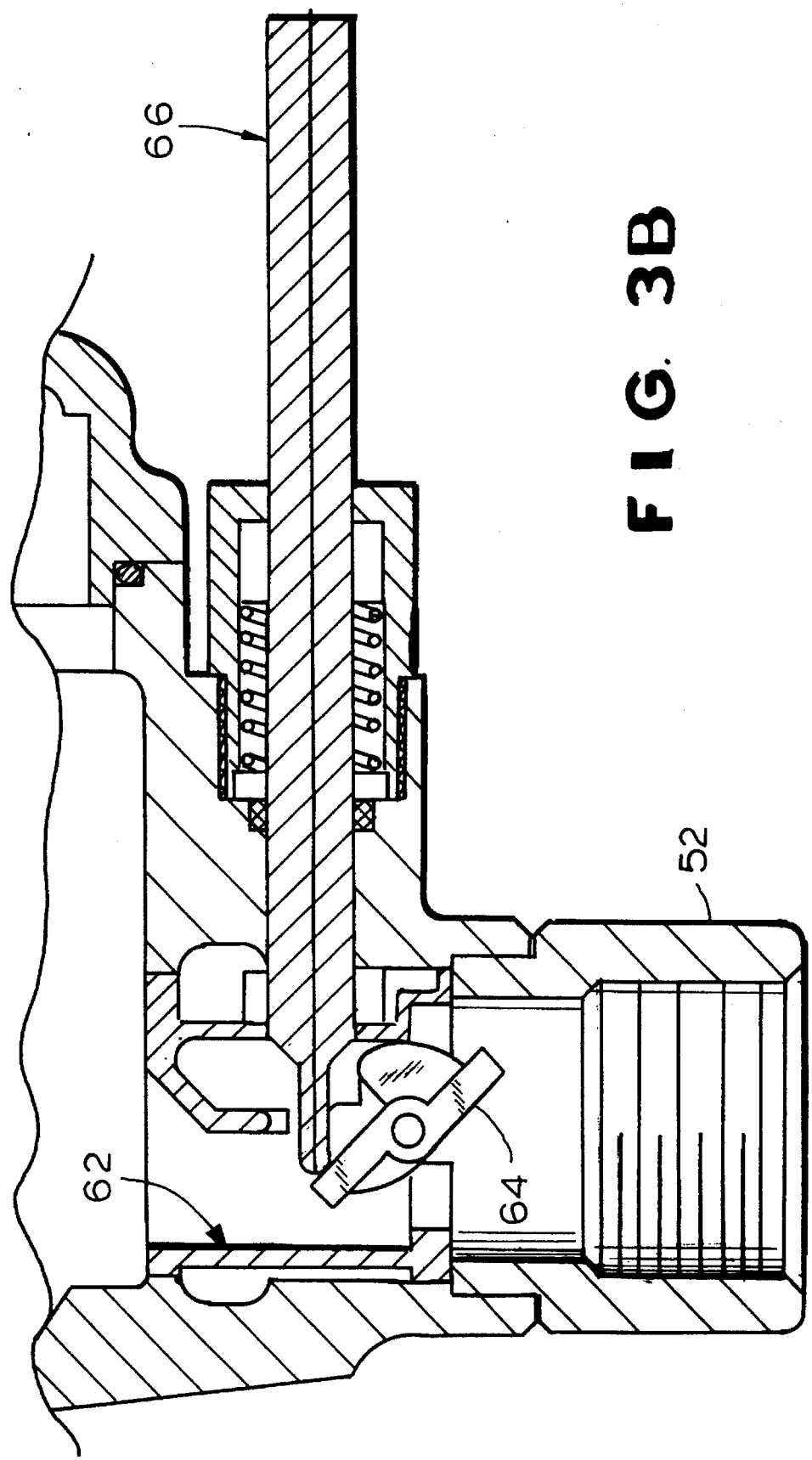
FIG. 3B is a partial sectional view of the valve section shown in FIG. 3 with the valve of this invention in an intermediate position.

Referring to FIG. 1 there is shown an exploded assembly view of the shower valve 10 of the present invention. A casing 12 is mounted in the wall 14 of the shower and is connected to the hot and cold water pipes (not shown), one being connected to the casing on each side thereof. The casing is also connected to outlet conduits (not shown) which lead to the shower head and to the tub faucet. The casing 12 has a central opening 16 which receives a mixing cartridge 18 such as those described in the aforementioned Canadian patent and patent applications.

The cartridge 18 has a pinion shaft 20 extending therefrom and a cover 22, with sealing ring 24 interposed, is assembled to the casing 12 via machine screws 26. An intermediate shaft 28 extends through the cover 22 and is attached to the pinion shaft 20 by a machine screw 30. An escutcheon plate 32 covers the opening in the shower wall and is attached to elongated bosses 34 on the cover 22 by machine screws 36. A control knob 38 is attached to the intermediate shaft 28 by a machine screw 40 and has a removable cover 42 to hide the screw 40 from view.

With reference to FIGS. 1, 2 and 3, the casing 12 is normally mounted between the studs of a bathroom wall and, in the case of back-to-back installations in which there is a tub/shower installation on each side of the wall, the hot and cold water supplies indicated by the letters A and B may be interchanged. With this apparatus it is simply a matter of positioning the cartridge in one of two possible orientations so as to permit the supply A to be either hot or cold with the other supply being the opposite temperature.

The casing 12 is best seen in FIGS. 3 and 4. The casing is preferably cast from brass and has a generally cylindrical section 44 with the optionally reversible hot and cold water inlets 46 and 48 on opposite sides thereof. A mixed water outlet 50 from the mixing chamber of the casing leads to a coupling 52 which in turn will be connected to a suitable conduit leading to the tub faucet (not shown). A diverter passage 54 is integrally cast into the casing, interconnecting the outlet 50 and an outlet 56 connectable to a suitable conduit leading to the shower head (not shown). Normally, mixed water will flow to the tub via outlet 50 and coupling 52. However, when the shower is to be used the diverter valve 60 of the present invention, positioned below the casing body 44, will be activated to prevent water flowing through the outlet 50 and thereby forcing it through the diverter passage 54 to the shower outlet 56.

The diverter valve assembly 60 of the present invention includes several components, namely insert means 62, a valve member 64 and an actuator rod member 66. Each of these components as well as the assembly thereof and their operation will be described hereinbelow and with reference to FIGS. 3 to 14.

The insert means 62 is best seen in FIGS. 3A, 3C, and 5 to 8. The insert means 62 is generally cylindrical in configuration, having a C-shaped wall section 68 and upper and lower peripheral flanges 70,72 extending radially of the wall 68. The wall 68 terminates at a straight wall section 74 and a plurality of circumferentially spaced arcuate projections 76 extend outwardly from the straight wall section 74. A straight transverse flange 78 angles inwardly and downwardly at an angle "x" within the interior of the insert means 62 and then extends downwardly (FIG. 8). The lower edge 80 of the flange 78 is generally arcuate as seen best in FIG. 7. The flange 78 and the opposite wall portion of the insert means define an outlet passageway 82 leading to the coupling 52 for mixed water exiting the mixing chamber of the mixing valve.

At the bottom of the insert means 62 there is provided a valve seat 84, the seat 84 being made up of two generally semi-circular portions 86 and 88. The seat portion 86 appears as a lip extending inwardly from the lower edge of a portion of the C-shaped wall section 68 while the seat 88 appears as an undercut below the straight wall 74 and the remainder of the C-shaped wall section 68.

An aperture 90 extends radially through the wall section 74 and has the same diameter as the inner arcuate surface of the projections 76. The spaces 92 between adjacent projections 76 define channels, the use of which will become apparent hereinafter. The flange 78 is also provided with an arcuate cutout portion 94 in its lower edge 80 that is collinear with the aperture 90, while the flange 72 is provided with an arcuate recess 95 in its upper edge as seen in FIG. 5.

The valve member 64 is best seen in FIGS. 3, 3A, 3B, 3C and 9 to 12. It is in the form of a circular disc or butterfly having a pair of semi-circular wing portions 96,98 leading away from a transverse journal section 100. The wing portions are offset from each other in the direction of water flow through the insert means, with the wing portion 96 being defined as the upstream wing and the wing portion 98 being defined as the downstream wing. A transverse bore 102 extends through the journal section 100 and carries a shaft 101 (FIG. 3C) receivable in the bores 103 at the bottom of the insert means 62 as seen in FIGS. 6 and 7 so as to rotatably mount the valve member in the insert means.

A lower strengthening portion 104 curves from the journal section to the upstream wing 96, leaving a narrow lower peripheral lip 106 on the undersurface of that wing. The downstream wing 98 carries a D-shaped counterweight 108 that extends away from the wing in a direction that can be considered as upstream of the valve member 64. The counterweight is located on the wing 98 so as to leave a narrow upper peripheral lip 110 on the upper surface of that wing. The counterweight has an arcuate outer wall 112 and is provided with a generally semi-cylindrical recess 114. The counterweight serves to bias the valve member 64 to a generally vertical orientation as seen in FIGS. 3 and 11 when there are no other forces operating on the valve member.

The actuator rod member 66 is best seen in FIGS. 3, 3A, 3B, 3C, 13 and 14. It includes an elongated cylindrical stem portion 116 with means (not shown) provided at the outer end 118 thereof for attachment thereto of a suitable knob 119 which will facilitate reciprocation and rotation of the rod member 66. At the inner end thereof the rod member has a cruciform section 120 defined by fight angle ribs 122 and a small diameter extension 124 that projects beyond the section 120. The diameter of the rod 66 is such as to provide a sliding fit in the aperture 90.

With reference to FIGS. 3A and 3C in particular it will be seen that the casing 12 is provided with an enlarged boss 126 below the cylindrical section 44, the boss having a central bore 128 extending therethrough. The bore 128 accommodates the rod member 66 to provide a sliding fit therewith. Since the rod member 66 is capable of rotation the bore 128 and the rod member 66 should be cylindrical in nature. Counterbores 130 and 132 open outwardly from the bore 128, the counterbore 132 being internally threaded so as to receive a threaded retaining cap 134. The cap 134 has an opening 136 through the end wall thereof through which the rod member 66 can pass. An O-ring 138 is receivable in the counterbore 130 to sealingly surround the rod member 66. A washer member 140 abuts the shoulder between the counterbores 130 and 132 to help retain the O-ring 138 in the counterbore 130 and to act as a fiat surface against which one end of a compression spring 142 can bear. The other end of the spring 142 bears against an annular flange 146 integrally provided on the rod member, the flange being slidably receivable within the cap 134. The cap defines a stop against which the flange 146 can abut when the spring 142 is fully expanded.

The operation of the diverter and volume control valve of the invention will now be described with particular reference to FIGS. 3, 3A, and 3B. FIG. 3 illustrates the normal rest position of the valve member 64 and the rod member 66. The valve member 64 is in its vertical orientation and the rod member is at its outer limit, biased thereto by the spring 142. Water flowing from the mixing valve will flow through the channel 82 to the coupling 52 and hence to the tub of the installation. If one now wants to use the shower, instead of the tub, one pushes the rod member 66 inwardly so that the tip of the extension 124 contacts the upstream wing 96 of the butterfly member 64 causing it to rotate on its shaft. Such rotation moves the valve member 64 towards the position shown in FIG. 3B wherein the wing is shown within the stream of water flowing in the channel 82. That water acts on the wing 96, forcing the valve member to rotate fully to the valve closed condition of FIG. 3A wherein the peripheral lip 106 contacts the semi-circular valve seat 86 and the peripheral lip 110 contacts the semi-circular seat 88. Water can no longer flow to the coupling 52 and the tub since the valve member now blocks the channel 82. The water instead is forced to flow through the aperture 90, past the ribs 122 and through the channels 92 into annular bypass channels 148 defined about the insert means 62. Those bypass channels in turn communicate with the diverter passage 54 and enable the water to now flow upwardly to the shower via the coupling 56.

When the valve member 64 is in its closed condition of FIG. 3A the recess 114 in the counterweight will accommodate the stem 116 of the rod member before the rod member is returned to is outer limit position of FIGS. 3 and 3A. Such return is effected by the water pressure in the insert means 62 as well as by the return spring 142.

If one wants to adjust the volume of water flowing to the shower one need only rotate the rod member slightly via the knob 119 as provided at the outer end thereof. When the rod member 66 is rotated the ribs 122 at the inner end thereof will interact with the projections 76 and channels 92 adjacent the aperture 90 to act as a throttle, allowing the volume passing thereby to increase or decrease as desired.

When the water is turned off at the mixing valve 12 there will no longer be sufficient water pressure acting on the upstream wing 96 of the valve member 64 to hold the valve member in its closed position and it will automatically resume its normal vertical orientation under the influence of the counterweight 108. Furthermore, it should be mentioned that the cooperation between the peripheral lips 98, 106 and the valve seats 86, 88 is such that there should always be a slight leak past the valve seats. Thus when the water is turned off there is little chance of water hammer and there is little chance of full water pressure within the insert means being maintained so as to prevent the valve member from rotating back to its normal orientation. If the valve member were prevented from rotating back to its vertical orientation the next usage of the mixing valve 12 would result in water flowing first to the shower rather than to the tub. This would not only surprise the person using the facility but it could also be dangerous if the water is very hot initially.

Should it become necessary to repair or replace the valve assembly 60 or any of the components thereof the present invention makes such repair or replacement very easy and convenient. After removing the escutcheon plate one gains access to the mixing valve 12. After removing the threaded cap 134, the rod member 66 can be withdrawn from the assembly. To remove the insert means 62 and the valve member 64 one need only undo the screws 26 holding the front cover 22 on the mixing valve casing 44, withdraw the mixing cartridge and then reach into the casing to pull the insert means 62 upwards and then outwards. A new or repaired insert can be replaced in the casing 44 and the mixing valve 12 reassembled for normal operation in very short order.

The present invention provides particular advantages over prior art diverter controls by being more conveniently located at the mixing valve control, by automatically returning the valve member to its normally open condition, and by providing a convenient control or adjustment of the volume of water flowing to the shower head when the diverter valve is in use. A preferred embodiment of the invention has been disclosed herein but it is understood that a skilled workman could effect detail changes thereto without departing from the spirit of the invention. For example, although the result would not be as efficient, it would be possible be locate the counterweight means, albeit in a different configuration, on the downstream side of the wing 98 rather than on the upstream side thereof as shown. Accordingly the protection to be afforded this invention is to be determined from the claims appended hereto.

I claim:

1. A diverter valve assembly for a shower control valve assembly having a casing with hot and cold water inlet means, mixed water outlet means, and means within the casing for mixing water entering via the inlet means and feeding mixed water to the outlet means, the outlet means leading to a tub faucet and being connected to diverter passage means leading to a shower head, said diverter valve assembly comprising: valve insert means positioned within said outlet means, said insert means including a valve seat and a rotatable valve member, said valve member having a pair of opposed wings engageable with said valve seat and counterweight means on one of said wings for biasing said valve member to a normally open position; and a reciprocable rod member extending laterally through said insert means and having an inner end thereof adjacent the other wing of said valve member for contact with said other wing so as to rotate said valve member towards a closed position thereof at which water is prevented from flowing through said insert means and is forced to flow into said diverter passage means towards the shower head.

2. The diverter valve assembly of claim 1 wherein said valve member is in the form of a butterfly member having a lateral axis of rotation, said one wing being downstream of said axis and said other wing being upstream of said axis, said insert means valve seat including downstream and upstream portions for engagement with said one and other wings respectively.

3. The diverter valve assembly of claim 2 wherein said insert means includes a C-shaped wall section closed by a straight wall section, an upper peripheral flange, a lower peripheral flange, and an aperture in said straight wall section, through which said rod member passes, said aperture being generally opposite said upstream wing of the valve member.

4. The diverter valve assembly of claim 3 wherein said upstream valve seat portion is in the form of a semi-circular lip extending inwardly of said insert means from the lower edge of a portion of said C-shaped wall section, and said downstream valve seat portion is in the form of a semi-circular shoulder undercut below said straight wall section and the remaining portion of said C-shaped wall section opposite said upstream seat portion.

5. The diverter valve assembly of claim 4 wherein: said insert means and said casing together define channel means leading to said diverter passage means; arcuate, circumferentially spaced projections extend from said straight wall section about said aperture defining channels therebetween communicating the interior of said insert means with said channel means; and the inner end of said rod member includes a plurality of ribs in a cruciform pattern; said rod member being rotatable whereby said ribs may cooperate with said projections and said channels to adjustably throttle water flowing from said mixing valve through said channel means to said diverter passage means.

6. The diverter valve assembly of claim 5 wherein said counterweight means is provided on the upstream surface of said one wing and includes a recess therein to accommodate said rod member when said valve member is in its closed position.

7. The diverter valve assembly of claim 5 wherein said counterweight means is provided on the downstream surface of said one wing.

8. The diverter valve assembly of claim 5 including return spring means positioned between said rod member and said insert means to automatically move said rod member away from said valve member after said valve member has been initially moved towards its closed position.

9. The diverter valve assembly of claim 5 wherein said casing includes an enlarged boss having a bore therein aligned with said aperture so as to receive said rod member therein, said bore leading to first and second outer counterbores, said first counterbore being adapted to receive an O-ring seal therein, and said second counterbore being internally threaded to receive a threaded cap member therein, said cap member having an end opening through which said rod member can pass.

10. The diverter assembly of claim 9 wherein said rod member has an annular flange thereon receivable within said cap member, and compression spring means are contained within said cap member, bearing against said annular flange to bias said rod member away from said valve member.

\* \* \* \* \*